June 27, 1961 P. BERTELL ET AL 2,989,897
REAR VISION MIRROR SUPPORT
Filed Sept. 29, 1958
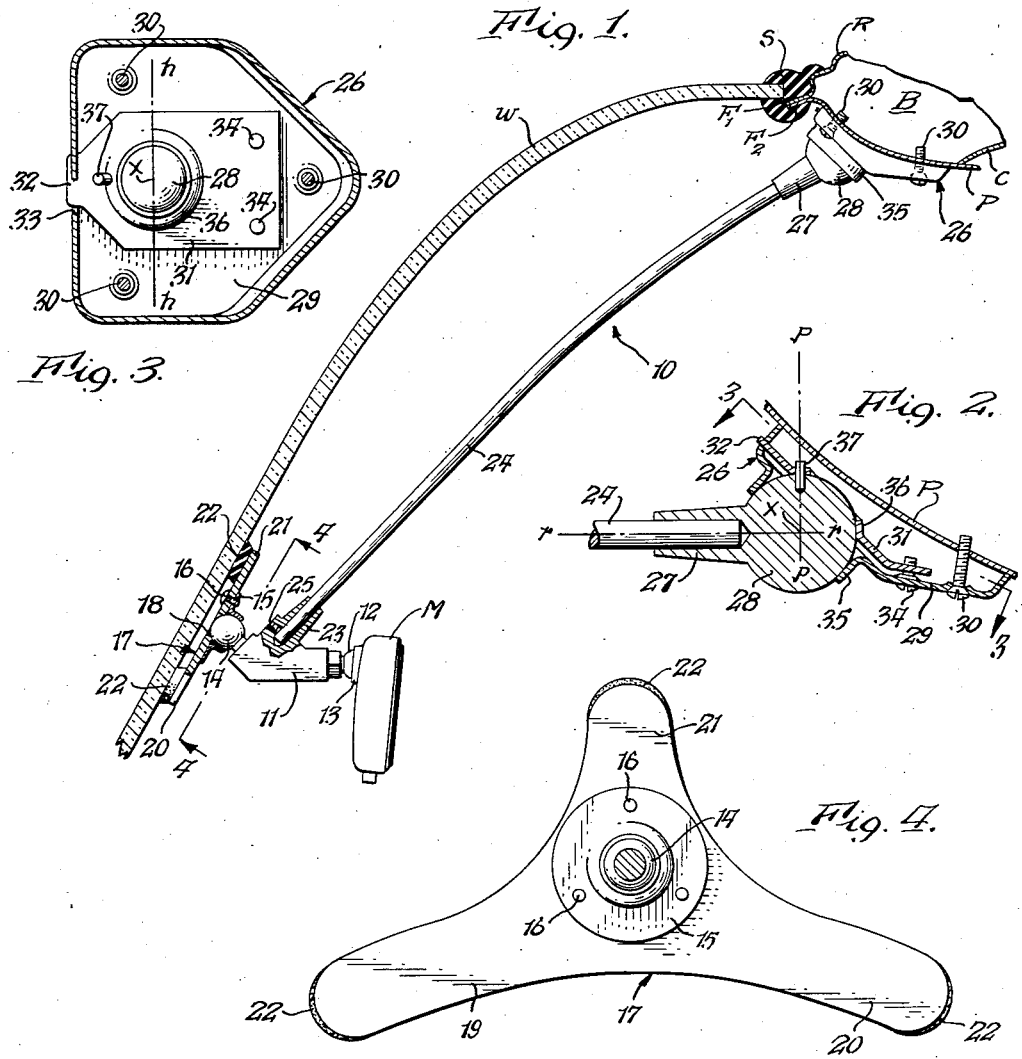
INVENTORS
Paul Bertell
Lynn C. Meade
by Popp and Sommer
Attorneys.

United States Patent Office 2,989,897
Patented June 27, 1961

2,989,897
REAR VISION MIRROR SUPPORT
Paul Bertell, Williamsville, and Lynn C. Meade, Buffalo, N.Y., assignors to Standard Mirror Company, Inc., Buffalo, N.Y., a corporation of New York
Filed Sept. 29, 1958, Ser. No. 764,079
8 Claims. (Cl. 88—93)

This invention relates to an improved rear vision mirror support for a vehicle, and more particularly to a support that is adapted to be mounted on a body portion of the vehicle and to be biased against the windshield of the vehicle.

Recently, the trend in automobile design has been to longer and lower bodies incorporating considerably more glass area, as particularly exemplified by the so-called "wrap around" windshields. The latest trend is to wrap such windshields not only around the sides of the car, but also around the top of the car. It is with this latest type of windshield that the present invention is primarily concerned.

As will be apparent, there are two basic locations for rear vision mirror supports currently being used in today's automobiles. The first is on the dashboard, with the mirror being supported below the eye level of the driver by a relatively short and substantially rigid, upright rod. While this type of support provides adequate rear vision for the driver of an otherwise empty vehicle, when passengers are riding in the front and/or back seats of the car, the driver's rear vision is often blocked, thereby creating a dangerous driving condition.

The second type of support is suspended from an upper body portion of the car, such as the windshield supporting frame, and the mirror is located at the lower end of a relatively short and substantially rigid rod, but at or above the driver's eye level. This minimizes obstructions to the driver's rear vision caused by the passengers. However, as modern windshields continue to curve upwardly and further back toward the rear of the car, such supports are not practical because the mirror would be too high and/or too far to the rear to see comfortably and safely, without craning his neck or turning his head. Furthermore, it is not feasible to overcome this situation by mounting such supports directly on the windshield, because of its relatively fragile nature.

Accordingly it is an object of this invention to provide an improved rear vision mirror support adapted to solve the various problems created by such modern windshields, and to overcome the deficiencies inherent in the supports commonly used at present.

It is another object of this invention to provide an improved rear vision mirror support adapted to be mounted on a body portion of a vehicle and to be biased against the windshield of the vehicle.

It is a further object of this invention to provide an improved rear vision mirror support adapted to be adjusted longitudinally and/or laterally of the windshield for proper horizontal and/or vertical positioning, to produce optimum conditions for maximum rear vision.

It is another object of the invention to provide an improved rear vision mirror support adapted to be adjusted for varying the bias thereof against the windshield.

It is a further object of this invention to provide an improved rear vision mirror support primarily adapted to be mounted on the body portion adjacent the upper end of the windshield, but also adapted to be mounted on the body portion adjacent the lower end of the windshield, as well.

It is another object of this invention to provide an improved rear vision mirror support adapted to firmly contact the windshield without damaging the same.

It is a further object of this invention to provide an improved rear vision mirror support adapted to movably mount a mirror thereon.

It is still another object of this invention to provide an improved rear vision mirror support adapted to minimize obstructions to the driver's rear vision.

It is still a further object of this invention to provide an improved rear vision mirror support adapted to be located so that the mirror can readily be seen by the driver comfortably and without strain.

Other objects and advantages of this invention will become apparent upon consideration of the following specification and claims when read in conjunction with the accompanying drawings wherein:

FIG. 1 is a vertical side elevation, with parts broken away in section, illustrating one embodiment of the invention as well as the preferred manner in which the embodiment is mounted on a body portion of a vehicle and is biased against the windshield;

FIG. 2 is an enlarged, partial sectional view of the upper portion of FIG. 1, illustrating the preferred body portion mounting in greater detail;

FIG. 3 is a section taken on line 3—3 of FIG. 2;

FIG. 4 is a sectional view taken on line 4—4 of FIG. 1 and illustrating the portion of the embodiment that is adapted to be biased against the windshield;

FIG. 5 is a partial side elevational view similar to FIG. 1, but illustrating a modification of the embodiment shown in FIG. 1, and FIG. 6 is a sectional view taken on line 6—6 of FIG. 5.

Referring to FIG. 1, a part of the arcuate windshield W is shown in cross-section as curving upwardly and toward the rear of the vehicle (not shown). The upper end of windshield W is preferably embedded in the usual rubber weather-stripping S and supported by a body portion of the vehicle such as B, in a well-known manner, and as taught by U.S. Patent 2,836,104. More specifically, the body portion B comprises the metal roof R, and ceiling C provided with cross-plate P, the roof and cross-plate having juxtaposed flanges F and $F_2$ respectively, which are embedded in weather-stripping S.

As will be apparent, the rear vision mirror support, which is generally indicated at 10, is preferably mounted on cross-plate P of body portion B at its upper end, and biased against a lower portion of windshield W at its lower end. Obviously, when used on a "convertible" or a so called "flip top, hard top" automobile, support 10 could be mounted on the windshield support itself (not shown), in any suitable manner. Furthermore, if desired, support 10 could readily be mounted on the "dashboard" (not shown) of the vehicle, and extend upwardly rather than downwardly, in the same biased condition against windshield W. In either event, the mirror mounting portion of support 10 would be located in front of the driver and preferably at or above his or her eye level, to minimize obstruction to the driver's rear vision.

In its preferred position, support 10 is basically composed of a metal fitting 11 extending substantially longitudinally of the vehicle (not shown). To the rear, fitting 11 is connected by a universal joint composed of a ball 12 on the fitting and a socket 13 in the back of a rear vision mirror assembly M, for movably mounting the assembly, all in a well known manner. The mirror assembly M is preferably of the glare reducing type disclosed in copending application, Serial No. 700,717, filed December 4, 1958, and entitled Rear Vision Mirror, but may be of any suitable type.

To the front, fitting 11 is connected by a universal joint composed of a ball 14 on the fitting and a circular flange plate 15 connected by screws 16 to a plate 17. The plate is provided with a central bore 18, which together with flange plate 15, forms a socket for receiving ball 14. Referring also to FIG. 4, plate 17 is provided with three angularly disposed and integral longer legs 19, 20 and shorter, transverse leg 21. In addition, each of legs 19, 20 and 21 are provided with disk-shaped, rubber cushions or feet 22 adapted to make firm, but resilient contact with windshield W, to avoid damage thereto.

Referring once again to FIG. 1, fitting 11 is provided with an upwardly extending tubular extension 23 for slidably receiving the lower end of a flexible and resilient, elongated rod 24, as well as a set screw 25 for releasably securing rod 24 within extension 23. Rod 24 is preferably molded of glass fibers to give it the required flexible and resilient characteristics, in order that it may be bent to bias plate 17 against windshield 12, in a manner to be described in detail below.

As also seen in FIGS. 2 and 3, rod 24 is connected by a pivotal or modified universal joint to a bracket 26, which is secured to the body portion B, rod 24 being embedded in the stem 27 of a ball 28, and bracket 26 being adapted to form a socket for receiving ball 28. Bracket 26 is composed of a lower plate 29 which is secured to cross-plate P by screws 30, as well as an upper plate 31 having a tab 32 extending through a slot 33 in plate 29 at one end, and secured to plate 29 by screws 34 at the other end. Plates 29 and 31 are provided with oppositely extending and substantially circular, flanges 35 and 36 respectively, to form a socket for receiving ball 28 on rod 24.

In addition, ball 28 is provided with a pin 37 embedded therein and extending through flange 36 on plate 31 which restricts the movement of ball 28 so that it is merely permitted to pivot about the axis of pin 37, thereby producing a pivotal joint between rod 24 and bracket 26. This pivotal joint has two important functions, the first of which is to cause plate 17 to be biased against windshield W, and the second of which is to locate the plate longitudinally or horizontally of the windshield, to be described in detail below.

As illustrated in FIG. 1, windshield W curves upwardly and rearwardly a substantial amount, to produce a "wrap around" effect for greater forward visibility. At the same time, the distance between body portion B and the proper location of rear vision mirror assembly M has substantially increased. Accordingly, it is necessary to use a much longer connecting member between these two elements. In view of the numerous vibrations encountered under even normal driving conditions, it is not practical merely to freely suspend mirror assembly M from body portion B because the necessarily elongated connection could not be made rigid enough to prevent mirror assembly M from oscillating and impairing the driver's rear vision. At the same time, it is not practical to mount mirror assembly M in position directly on windshield W, because of the latter's fragile nature as well as the definite probability of leaks occurring through the required mounting means.

Accordingly, pin 37 is designed to bend the flexible and resilient rod 24 toward windshield W to bias plate 17 thereagainst, and thereby provide a firm support for locating and maintaining mirror assembly M in proper position, without damaging or marring in any way, the relatively fragile windshield W. To this end, the axis $p$—$p$ of pin 37 (FIG. 2) and the axis $r$—$r$ of rod 24 (FIG. 2) are so related, and the length of rod 24 so proportioned, that when bracket 26 is secured to body portion B, rod 24 will be bent about a substantial horizontal axis $h$—$h$ (FIG. 3) that is also substantially perpendicular to the axis of the rod. In the preferred embodiment illustrated, the axis $p$—$p$ of pin 37 is substantially perpendicular to both of the aforesaid axes, all of which intersect in a common point X substantially at the center of ball 28. In addition, it is preferred that axes $h$—$h$ and $r$—$r$ be located in a common plane extending substantially transversely of windshield W and longitudinally of the vehicle (not shown), and that axis $h$—$h$ extend longitudinally of windshield W and transversely of the vehicle.

The second important function of pin 37 is to pivot rod 24 longitudinally of windshield W for properly locating plate 17 and mirror assembly M horizontally against the windshield. At the same time, the universal joint between fitting 11 and plate 17 permits the latter to conform closely to the surface of windshield W. As also seen in FIG. 4, longer and substantially horizontal legs 19 and 20 of plate 17 provide the desired stability longitudinally of windshield W, and shorter, substantially vertical leg 21, the desired stability laterally or vertically of the windshield, all without appreciably interfering with forward vision.

Referring now to FIGS. 5 and 6, a modified form of the invention is illustrated therein. In this embodiment, fitting 11 is provided with a tubular extension 38 slidably receiving rod 24 and having external threads 39. A collar 40 having internal threads 41 engageable with threads 39 is provided with an end wall 42 slidably mounted over rod 24, and a substantially conical ring 43 is adapted to be wedged between rod 24 and tubular extension 38, as collar 40 is threaded over the tubular extension, to lock the rod therein. As will be apparent, this structure forms an effective means for securing rod 24 to fitting 11.

In addition, it provides an effective means for varying the bend and length of rod 24 between the fitting and bracket 26. This latter feature provides two important functions. The first is to adjust the bias of plate 17 against windshield W and the second is to locate the plate laterally or vertically of the windshield. To remedy this situation, collar 40 and ring 43 are loosened, and tubular extension 38 is slid up over rod 24 to increase the bend therein and to decrease its length, until plate 17 is located at the proper height and is biased firmly against windshield W.

Ordinarily bracket 26 is designed to be mounted centrally on body portion B and the bend and length of rod 24 as well as the included angle between axes $p$—$p$ and $r$—$r$ are so proportioned that plate 17 is biased firmly against the longitudinal center of windshield W in order to locate and maintain mirror assembly M slightly to one side, and at or above the eye level of the average driver. Thus, it is usually not necessary to pivot rod 24 longitudinally of windshield W or to employ the modification of FIGS. 5 and 6 to vary the bend and length of rod 24. However, if the driver is exceptionally tall or short, or if the vehicle has a peculiar design, one or more of such adjustments might become necessary. Accordingly, within practical limitations, rod 24 may be made long enough and bent sufficiently under the normal conditions described above, that mirror assembly M may be adjusted longitudinally and/or vertically of windshield W while still maintaining the required bias between plate 17 and the windshield.

Moreover, the bias produced by rod 24 is normally sufficient to prevent accidential pivotal movement of the rod in making the usual fine adjustments of mirror assembly M. However, to ensure against such movement, screws 34 may be tightened to substantially increase the friction between ball 28 and flanges 35, 36 over that between ball 12 and socket 13.

It will now be seen that the invention, in accomplishing tis objects, not only overcomes the various deficiencies inherent in the prior art devices, but also possesses numerous advantages over such device, both in structure and function.

While the embodiments of the invention have been shown and described in certain preferred forms, it is to be understood that various changes may be made therein without departing from the principles of the invention, the scope of which is to be determined by the appended claims.

We claim:

1. In a vehicle having a windshield and body portion supporting one end of said windshield, the combination therewith of a rear vision mirror, and a support therefor comprising a fitting having means for movably mounting said mirror and movable means for contacting said windshield, a flexible and resilient elongated member extending from said fitting toward said body portion, a bracket engaging said body portion, means connecting said member to said bracket for bending said member toward said windshield about an axis substantially perpendicular to the major axis of said member to bias said contacting means against said windshield, and adjustable means engagable with said fitting and member for securing the same together and for varying the bend and length of the member to respectively adjust the bias of and locate said contacting means against said windshield.

2. In a vehicle having a windshield and a body portion supporting one end of said windshield, the combination therewith of a rear vision mirror, and a support therefor comprising a fitting having means for movably mounting said mirror and universally movable means for contacting said windshield, a flexible and resilient elongated member extending from said fitting toward said body portion, a bracket engaging said body portion, and pivotal means connecting said member to said bracket for bending said member toward said windshield about one axis substantially perpendicular to the major axis of said member and for pivoting said member longitudinally of said windshield about another axis substantially perpendicular to said one axis to respectively bias and locate said contacting means against said windshield.

3. In a vehicle having a windshield and a body portion supporting one end of said windshield, the combination therewith of a rear vision mirror, and a support therefor comprising a fitting having means for movably mounting said mirror and universally movable means for contacting said windshield, a flexible and resilient elongated member extending from said fitting toward said body portion, a bracket engaging said body portion, pivotal means connecting said member to said bracket for bending said member toward said windshield about one axis substantially perpendicular to the major axis of said member and for pivoting said member longitudinally of said windshield about another axis substantially perpendicular to said one axis to respectively bias and longitudinally locate said contacting means against said windshield, and adjustable means on said fitting and engageable with said member for securing the same together and for varying the bend and length of said member to respectively adjust the bias of and laterally locate said plate against said windshield.

4. In a vehicle having a windshield extending upwardly and toward the rear of said vehicle, and a body portion supporting the upper end of said windshield, the combination therewith of a rear vision mirror, and a support therefor comprising a fitting having means for movably mounting said mirror, a plate contacting a lower portion of said windshield, a universal joint connecting said plate to said fitting, a flexible and resilient elongated rod extending upwardly from said fitting toward said body portion, a bracket engaging said body portion, and a pivotal joint connecting said rod to said bracket for bending said rod toward said windshield about a substantially horizontal axis substantially perpendicular to the major axis of said rod and for pivoting said rod longitudinally of said windshield about another axis substantially perpendicular to said horizontal axis to respectively bias and locate said plate against said windshield.

5. In a vehicle having a windshield extending upwardly and toward the rear of said vehicle, and a body portion supporting the upper end of said windshield, the combination therewith of a rear vision mirror, and a support therefor comprising a fitting having means for movably mounting said mirror, a plate contacting a lower portion of said windshield, a universal joint connecting said plate to said fitting, a flexible and resilient elongated rod extending upwardly from said fitting toward said body portion, a bracket engaging said body portion, a pivotal joint connecting said rod to said bracket for bending said rod toward said windshield about a substantially horizontal axis substantially perpendicular to the major axis of said rod and for pivoting said rod longitudinally of said windshield about another axis substantially perpendicular to said horizontal axis to respectively bias and horizontally locate said plate against said windshield, and an externally threaded tubular extension on said fitting for slidably receiving said rod, an internally threaded collar slidably mounted over said rod, and means adapted to be wedged between said rod and tubular extension by said collar, as said collar is threaded over said tubular extension, for locking said rod therein and for varying the bend and length of the rod to respectively adjust the bias of and vertically locate said plate against said windshield.

6. In a vehicle having an arcuate windshield curving upwardly and toward the rear of said vehicle, and a body portion supporting the upper end of said windshield, the combination therewith of a rear vision mirror, and a support therefor comprising a fitting having means for movably mounting said mirror, a plate having a plurality of angularly disposed legs provided with cushioning means contacting a lower portion of said windshield, a universal joint connecting said plate and fitting, a flexible and resilient elongated rod extending upwardly from said fitting toward said body portion, a bracket engaging said body portion, and a pivotal joint connecting said rod to said bracket, said joint being provided with means for bending said rod toward said windshield about a substantially horizontal axis substantially perpendicular to the major axis of said rod and for pivoting said rod longitudinally of said windshield about another axis substantially perpendicular to said horizontal axis to respectively bias and locate said plate against said windshield.

7. In a vehicle having an arcuate windshield curving upwardly and toward the rear of said vehicle, and a body portion supporting the upper end of said windshield, the combination therewith of a rear vision mirror, and a support therefor comprising a fitting having means for movably mounting said mirror, a plate having a plurality of angularly disposed legs provided with cushioning means contacting a lower portion of said windshield, a universal joint connecting said plate and fitting, a flexible and resilient elongated rod extending upwardly from said fitting toward said body portion, a bracket engaging said body portion, a pivotal joint connecting said rod to said bracket, said joint being provided with means for bending said rod toward said windshield about a substantially horizontal axis substantially perpendicular to the major axis of said rod and for pivoting said rod longitudinally of said windshield about another axis substantially perpendicular to said horizontal axis to respectively bias and horizontally locate said plate against said windshield, and an externally threaded tubular extension on said fitting for slidably receiving said rod, an internally threaded collar having an end wall slidably mounted over said rod, and a substantially conical ring adapted to be wedged between said rod and tubular extension by said end wall, as said collar is threaded over said tubular extension, for locking said rod therein and for varying the bend and length of the rod to respectively adjust the bias of and vertically locate said plate against said windshield.

8. In a vehicle having an arcuate windshield curving upwardly and toward the rear of said vehicle, and a body portion supporting the upper end of said windshield, the combination therewith of a rear vision mirror, and a support therefor comprising a fitting having means for movably mounting said mirror, a plate having three angularly disposed legs provided with rubber feet contacting a lower portion of said windshield, two of said legs being longer than the third leg and extending transversely thereof in a substantially horizontal direction for maximum stable contact with said windshield, a ball and socket joint connecting said plate and fitting, a flexible and resilient elongated rod extending upwardly from said fitting toward said body portion, a bracket engaging said body portion and a ball and socket joint connecting said rod to said bracket, said ball being provided with a pin extending through a wall of said socket for bending said rod toward said windshield about a substantially horizontal axis substantially perpendicular to the major axis of said rod and for pivoting said rod longitudinally of said windshield about the axis of said pin which is substantially perpendicular to the aforesaid axes to respectively bias and locate said plate against said windshield.

References Cited in the file of this patent

UNITED STATES PATENTS

| | | |
|---|---|---|
| 1,424,405 | Haughton | Aug. 1, 1922 |
| 1,646,660 | Prince | Oct. 25, 1927 |
| 2,503,373 | Browning | Apr. 11, 1950 |
| 2,836,104 | Bertell et al. | May 27, 1958 |

FOREIGN PATENTS

| | | |
|---|---|---|
| 1,011,299 | Germany | June 27, 1957 |